United States Patent
Plioska et al.

(10) Patent No.: US 10,876,580 B2
(45) Date of Patent: Dec. 29, 2020

(54) TORQUE CONTROL SYSTEM

(71) Applicant: SAINT-GOBAIN PERFORMANCE PLASTICS PAMPUS GMBH, Willich (DE)

(72) Inventors: Lukas Plioska, Willich (DE); Jens D. Speicher, Willich (DE); Thiemo Kuesters, Viersen (DE); Volker Huenten, Mönchengladbach (DE); Daniel Barucha, Krefeld (DE)

(73) Assignee: SAINT-GOBAIN PERFORMANCE PLASTICS PAMPUS GMBH, Willich (DE)

( * ) Notice: Subject to any disclaimer, the term of this patent is extended or adjusted under 35 U.S.C. 154(b) by 182 days.

(21) Appl. No.: 15/826,842

(22) Filed: Nov. 30, 2017

(65) Prior Publication Data
US 2018/0156282 A1 Jun. 7, 2018

Related U.S. Application Data (60) Provisional application No. 62/428,350, filed on Nov. 30, 2016.

(51) Int. Cl.
*F16D 7/02* (2006.01)
*B25B 23/14* (2006.01)
*F16D 43/21* (2006.01)

(52) U.S. Cl.
CPC ............ *F16D 7/027* (2013.01); *B25B 23/141* (2013.01); *F16D 43/216* (2013.01); *Y10S 29/025* (2013.01); *Y10T 29/49826* (2015.01)

(58) Field of Classification Search
CPC ..... F16D 7/027; F16D 43/216; B25B 23/141; Y10T 29/49826; Y10S 29/025
USPC ..... 464/45–48; 192/107 M; 29/428, DIG. 25
See application file for complete search history.

(56) References Cited

U.S. PATENT DOCUMENTS

| | | | |
|---|---|---|---|
| 3,207,000 A * | 9/1965 | White | F16F 7/06 192/107 M |
| 3,715,986 A | 2/1973 | Dunlap et al. | |
| 3,877,274 A | 4/1975 | Wahlstedt | |
| 3,914,178 A | 10/1975 | Fineran et al. | |
| 4,542,812 A | 9/1985 | Westley et al. | |
| 5,550,694 A | 8/1996 | Hyde | |

(Continued)

FOREIGN PATENT DOCUMENTS

| WO | 2005092517 A1 | 10/2005 |
|---|---|---|
| WO | 2018100085 A1 | 6/2018 |

OTHER PUBLICATIONS

International Search Report and Written Opinion for PCT/EP2017/081027, dated Mar. 28, 2018, 13 pages.

*Primary Examiner* — Greg Binda
(74) *Attorney, Agent, or Firm* — Abel Schillinger, LLP; Chi Suk Kim (57) ABSTRACT

A torque assembly including a housing including a first piece, a bore, a first coupling attachment; a second piece including a second coupling attachment; a pin including a flange and a pin protrusion, where the pin protrusion protrudes through the bore of the first piece; a first washer including a compound layer adapted to contact the pin and the first piece of the housing to modify torque between the first piece and the pin; and a second washer including a compound layer adapted to contact the pin and the second piece of the housing to modify torque between the second piece and the pin.

20 Claims, 2 Drawing Sheets

(56) References Cited

U.S. PATENT DOCUMENTS

| | | | |
|---|---|---|---|
| 6,295,910 B1 | 10/2001 | Childs et al. | |
| 7,828,663 B2 * | 11/2010 | Saeki | F16F 15/1297 |
| | | | 464/46 |
| 8,398,491 B2 * | 3/2013 | Saeki | F16D 13/64 |
| | | | 464/46 |
| 8,679,126 B2 | 3/2014 | Stad et al. | |
| 2006/0062650 A1 | 3/2006 | Keener | |
| 2009/0131208 A1 | 5/2009 | Hawryluck et al. | |
| 2010/0078284 A1 | 4/2010 | Nilsson et al. | |
| 2012/0031726 A1 | 2/2012 | Grubb et al. | |
| 2012/0059483 A1 | 3/2012 | Greenhalgh et al. | |
| 2013/0160586 A1 | 6/2013 | Johnson et al. | |
| 2013/0195388 A1 | 8/2013 | Ishii et al. | |
| 2015/0021135 A1 | 1/2015 | Jameson | |
| 2015/0204383 A1 | 7/2015 | Ishii et al. | |
| 2015/0321326 A1 | 11/2015 | Nino et al. | |

* cited by examiner

TORQUE CONTROL SYSTEM

CROSS-REFERENCE TO RELATED APPLICATION(S)

This application claims priority under 35 U.S.C. § 119(e) to U.S. Provisional Application No. 62/428,350 entitled "TORQUE CONTROL SYSTEM", by Lukas PLIOSKA et al., filed Nov. 30, 2016, which is assigned to the current assignee hereof and incorporated herein by reference in its entirety.

FIELD OF THE DISCLOSURE

This disclosure relates to an apparatus comprising mating inner and outer components, which are mounted together using washer. By non-limiting example, the apparatus can be used for a torque assembly.

BACKGROUND

A torque assembly can be used to adjust, enhance, or limit the amount of torque being transferred from a torque supplying input (such as a shaft), to a torque receiving output (such as an appliance). Torque assemblies can provide rotating mechanical power in transmission systems to prevent damage to mechanical equipment. A torque assembly can limit torque or provide torque overload protection for many types of transmission systems. A torque assembly can enhance torque for many types of transmission systems. In a number of applications, the torque supplying input may be connected to a torque generating device powered by wind, water, steam, gas or the like. In a number of variations, the torque receiving output may be an electrical generator, tool, or industrial machinery requiring an input of torque for operation.

Problems can occur in torque assemblies due to overload situations, larger size and complexity of assembly, varying torque over a lifetime due to wear or abrasion of the components of the assembly, or performance of the torque assembly components being dependent on temperature or other conditions.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item. Also, the use of "about" or "substantially" is employed to convey spatial or numerical relationships that describe any value or relationship that does not depart from the scope of the invention.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the torque assembly and tolerance ring arts.

A torque assembly in accordance with one or more embodiments described herein can include torque assembly comprising: housing comprising a first piece comprising a first face, a bore, and a first coupling attachment, and a second piece comprising a second coupling attachment; a pin comprising a flange and a pin protrusion extending therefrom, the pin protrusion protruding through the bore of the first piece; a first washer comprising a compound layer thereon adapted to contact the pin and the first piece of the housing to modify torque between the first piece and the pin; and a second washer comprising a compound layer thereon adapted to contact the pin and the second piece of the housing to modify torque between the second piece and the pin.

In an embodiment, the torque assembly can include a housing comprising: a first piece having a central axis comprising a axial first end comprising a first face, a bore, and a axial second end comprising a flange projecting around a circumference of the first face, and a second piece comprising a axial first end comprising a first face, and a axial second end comprising a flange projecting around a circumference of the first face; a pin comprising a axial first end comprising a first face and an axial second end comprising a pin protrusion protruding from the first face through the bore of the first piece; a first washer comprising a compound layer thereon adapted to contact the pin and the first piece of the housing to modify torque between the first piece and the pin; and a second washer comprising a compound layer thereon adapted to contact the pin and the second piece of the housing to modify torque between the second piece and the pin, wherein the torque assembly is substantially free of lubricant.

An embodiment may include a method comprising: providing a torque assembly comprising: a housing comprising a first piece comprising first face, a bore, and a first coupling attachment, and a second piece comprising a second coupling attachment; a pin comprising a flange and a pin protrusion; a first washer comprising a compound layer thereon adapted to contact the pin and the first piece of the housing to modify torque between the first piece and the pin; and a second washer comprising a compound layer thereon adapted to contact the pin and the second piece of the housing to modify torque between the second piece and the pin; contacting the first washer with the first face of the first piece of the housing; contacting the second washer with the first face of the second piece of the housing; contacting the first piece of the housing with the second piece of the housing to at least partially surround the pin such that the pin contacts the first washer and the second washer, and the pin protrusion protrudes through the bore of the first face of the first piece; and rotating the assembly wherein at least one of the first washer or the second washer provides modification of torque based on the compound layer on at least one of the first washer or the second washer.

In an embodiment, the pin protrusion comprises a protrusion face comprising a non-round cross-section. In an embodiment, at least one of the first washer or the second washer comprises at least one circumferential slot along its thickness. In an embodiment, the second piece of the housing further comprises a second face comprising a housing connector. In an embodiment, the housing comprises a locking assembly comprising at least one male attachment component and at least one female attachment component adapted to lock the first piece of the housing to the second piece of the housing. In an embodiment, the compound layer of the first washer comprises a first layer comprising a first polymer and a second layer comprising a second polymer. In an embodiment, the first polymer of the first washer comprises a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof. In an embodiment, the second polymer of the first washer comprises a fluoropolymer. In an embodiment, the compound layer of the second washer comprises a first layer comprising a first polymer and a second layer comprising a second polymer. In an embodiment, the first polymer of the second washer comprises a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof. In an embodiment, the second polymer of the second polymer comprises a fluoropolymer. In an embodiment, the first washer comprises a first face comprising a washer bore contacting the pin protrusion along its circumference. In an embodiment, the torque assembly is adapted to modify the torque X between about 0≤X≤about 10 N·m between the pin and at least one of the first piece and the second piece of the housing. In an embodiment, a radius of the first washer $R_{w1}$ abuts an inner radial edge of the flange of the first piece of the housing. In an embodiment, a radius of the second washer $R_{w2}$ abuts an inner radial edge of the flange of the second piece of the housing. In an embodiment, at least one of the first washer or the second washer comprises a cup spring washer. In an embodiment, at least one cup spring washer has a spring rate of at least about 10 N/mm, about 25 N/mm, about 50 N/mm, about 100 N/mm, about 200 N/mm, about 500 N/mm, about 1000 N/mm, about 2000 N/mm, about 5000 N/mm, about 10000 N/mm. In an embodiment, the torque assembly has a length of no greater than 5 mm, no greater than 10 mm, no greater than 15 mm, no greater than 20 mm, no greater than 30 mm, no greater than 40 mm.

Referring initially to FIGS. 1A-3D, a torque assembly 2 generally includes a torque supplying input and a torque receiving output directed along a central axis 100 that runs axially down the cross-section of the torque assembly. The torque supplying input may be in the form of a pin 4 having a first end 4a and a second end 4b. The torque receiving output may be in the form of a housing 8, having a first piece 10 and a second piece 12. The first piece 10 may have a first end 10a and a second end 10b along the axial length of the first piece 10, and the second piece 12 may have a first end 12a and a second end 12b along the axial length of the second piece 12. The torque supplying input and the torque receiving output may be operatively coupled together. The torque supplying input can be coupled to a torque generating device (not illustrated) while the torque receiving output may be coupled to a machine requiring torque (not illustrated). In an embodiment, the torque receiving output may be in the form of a pin 4, and the torque supplying input may be in the form of a housing 8. In another embodiment, the torque receiving output may be in the form of a housing 8, and the torque supplying input may be in the form of a pin 4.

In an embodiment, the first piece 10 may include a first face 13, and a first piece bore 19 through the first face 13. The first piece 10 may include a first circumferential flange 15 projecting axially from the first face 13. The radius of the first piece 10 of the housing 8 $R_{H1}$ may be at least 5 mm, at least 10 mm, at least 15 mm, at least 20 mm, at least 30 mm, at least 40 mm. The radius of the first piece 10 of the housing 8 $R_{H1}$ may be no greater than 5 mm, no greater than 10 mm, no greater than 15 mm, no greater than 20 mm, no greater than 30 mm, no greater than 40 mm. The radius of the first piece bore 19 of the first piece 10 of the housing 8 $R_{H1}$ may be at least 5 mm, at least 10 mm, at least 15 mm, at least 20 mm, at least 30 mm, at least 40 mm. The radius of the first piece bore 19 of the first piece 10 of the housing 8 $R_{B1}$ may be no greater than 5 mm, no greater than 10 mm, no greater than 15 mm, no greater than 20 mm, no greater than 30 mm, no greater than 40 mm. The first piece 10 of the housing 8 can have an axial length, $L_{H1}$, as measured between axial ends 10a and 10b, of no greater than 5 mm, no greater than 10 mm, no greater than 15 mm, no greater than 20 mm, no greater than 30 mm, no greater than 40 mm. The first piece 10 of the housing 8 can have an axial length, $L_{H1}$, as measured between axial ends 10a and 10b, of at least 5 mm, at least 10 mm, at least 15 mm, at least 20 mm, at least 30 mm, at least 40 mm. The first circumferential flange 15 may have a radial thickness $T_{F1}$ of be at least 5 mm, at least 10 mm, at least 15 mm, at least 20 mm, at least 30 mm, at least 40 mm. The first circumferential flange 15 may have a radial thickness $T_{F1}$ that may be no greater than 5 mm, no greater than 10 mm, no greater than 15 mm, no greater than 20 mm, no greater than 30 mm, no greater than 40 mm. The first piece 10 of the housing 8 may be made of a material conventional in the art such as, but not limited to, a metal or metal alloy, a polymer, or a composite material. The housing 8 first piece 10 may include an exterior surface 11.

In an embodiment, the second piece 12 may include a first face 23. The second piece 12 may also include a first circumferential flange 25 projecting axially from the first face 23. The radius of the second piece 12 of the housing 8 $R_{H2}$ may be at least 5 mm, at least 10 mm, at least 15 mm, at least 20 mm, at least 30 mm, at least 40 mm. The radius of the second piece 12 $R_{H1}$ may be no greater than 5 mm, no greater than 10 mm, no greater than 15 mm, no greater than 20 mm, no greater than 30 mm, no greater than 40 mm. The second piece 12 of the housing 8 can have an axial length, $L_{H2}$, as measured between axial ends 12a and 12b, of no greater than 5 mm, no greater than 10 mm, no greater than 15 mm, no greater than 20 mm, no greater than 30 mm, no greater than 40 mm. The second piece 12 of the housing 8 can have an axial length, $L_{H2}$, as measured between axial ends 12a and 12b, of at least 5 mm, at least 10 mm, at least 15 mm, at least 20 mm, at least 30 mm, at least 40 mm. The first circumferential flange 25 may have a radial thickness $T_{F2}$ of be at least 5 mm, at least 10 mm, at least 15 mm, at least 20 mm, at least 30 mm, at least 40 mm. The first circumferential flange 25 may have a radial thickness $T_{F2}$ that may be no greater than 5 mm, no greater than 10 mm, no greater than 15 mm, no greater than 20 mm, no greater than 30 mm, no greater than 40 mm. The he second piece 12 of the housing 8 may be made of a material conventional in the art such as, but not limited to, a metal or metal alloy, a polymer, or a composite material. The housing 8 second piece 12 may include an exterior surface 17.

In an embodiment, the first piece 10 of the housing 8 may include a first coupling component 40, and the second piece 12 of the housing 8 may include a second coupling component 42. The first coupling component 40 may pair with the second coupling component 42 to engage or couple the first piece 10 to the second piece 12. The first coupling component 40 may pair or engage with the second coupling component 42 to at least partially surround the pin 4. The first coupling component 40 may include a male attachment and the second coupling component 42 can include a female attachment. In an embodiment, at least one of the first coupling component 40 or the second coupling component 42 may include screw threads or other form of threads, bolts, battens, buckle, clamp, clip, flange, frog, grommet, hook-and-eye, latch, peg, nail, rivet, screw anchor, snap fastener, stitch, threaded fastener, tie, toggle bolt, wedge anchor, hole and screw combination, or may be coupled a different way.

Figure 1A:
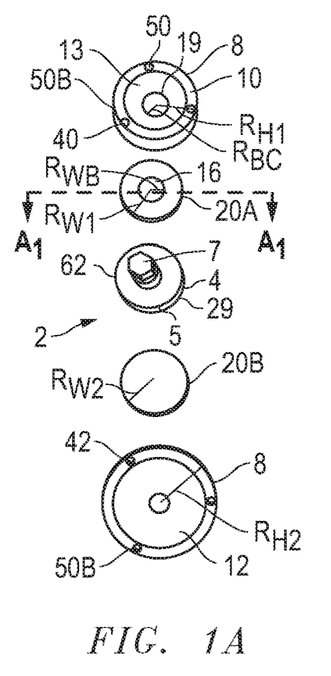
FIG. 1A is an exploded perspective view of a torque assembly according to an embodiment of the invention.
Figure 3A:
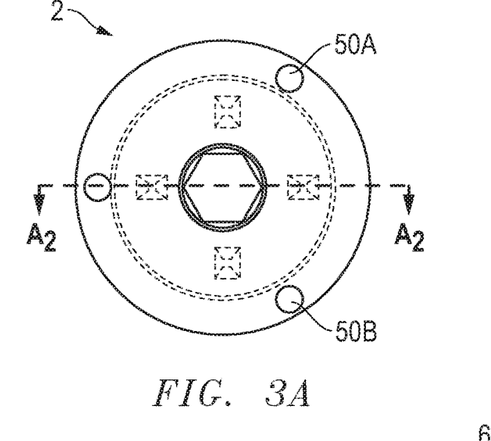
FIG. 3A is an perspective view of a torque assembly according to an embodiment of the invention.
Figure 3B:
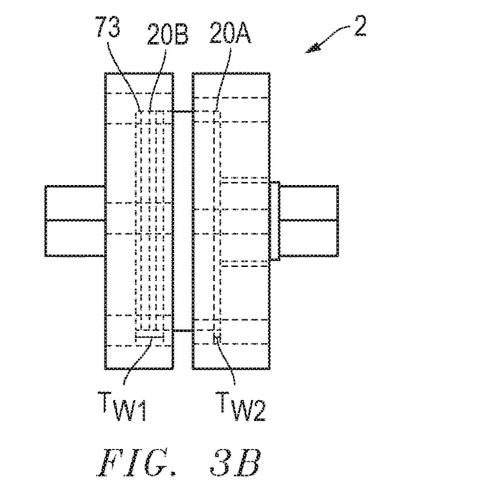
FIG. 3B is a perspective view of a torque assembly according to an embodiment of the invention.

In an embodiment, the torque assembly 2 may include a locking mechanism 50. The locking mechanism 50 may pair with at least one of the first coupling component 40 and the second coupling component 42 to lock the first piece 10 of the housing 8 in place with respect to the second piece 12 of the housing 8. The locking mechanism 50 may include a pin, groove and stop, nut and bolt, nut and screw, latch, handle, locking nut, tie rivet, or may be locked another way. As shown in FIGS. 1A and 3A, the locking mechanism 50 may include a screw 50a on the second piece 12, and a screw bore 50b on the first piece 10 of the housing 8 to lock the torque assembly 2.

In an embodiment, the second piece 12 of the housing 8 may include a housing connector or housing input/output connector 60 along a second face 18 of the second piece 12 of the housing 8. The housing input/output connector 60 may connect the housing 8 to an additional component including, but not limited to, the torque supplying input or the torque receiving output. The housing component input/output connector 60 may include a male attachment. The male attachment may include a protrusion. The protrusion may have a non-round or polygonal cross-section. The housing input/output connector 60 may include a female attachment. The female attachment may include a bore. The bore may have a non-round or polygonal cross-section.

In an embodiment, the pin 4 may include a flange 5. The pin 4 may include a pin protrusion 7 extending from the flange 5. The pin protrusion 7 may be adapted to protrude through the bore 19 of the first piece 10. The radius of the pin $R_p$ may be at least 5 mm, at least 10 mm, at least 15 mm, at least 20 mm, at least 30 mm, at least 40 mm. The radius of the pin $R_p$ may be no greater than 5 mm, no greater than 10 mm, no greater than 15 mm, no greater than 20 mm, no greater than 30 mm, no greater than 40 mm. The axial length of the pin 4, $L_P$, as measured between axial ends 4a and 4b, may be at least 5 mm, at least 10 mm, at least 15 mm, at least 20 mm, at least 30 mm, at least 40 mm. The axial length of the pin 4, $L_P$, as measured between axial ends 4a and 4b, may be no greater than 5 mm, no greater than 10 mm, no greater than 15 mm, no greater than 20 mm, no greater than 30 mm, no greater than 40 mm. The axial thickness of the flange 5 $T_{FP}$ may be at least 5 mm, at least 10 mm, at least 15 mm, at least 20 mm, at least 30 mm, at least 40 mm. The axial thickness of the flange 5 $T_{FP}$ that may be no greater than 5 mm, no greater than 10 mm, no greater than 15 mm, no greater than 20 mm, no greater than 30 mm, no greater than 40 mm. The pin 4 may be made of a material conventional in the art such as, but not limited to, a metal or metal alloy, a polymer, or a composite material. The pin may include an exterior surface 29.

In an embodiment, the pin 4 may include a pin connector 62 or pin input/output connector 62. The pin input/output connector 62 may connect the pin 4 to an additional component including, but not limited to, the torque supplying input or the torque receiving output. The pin input/output connector 62 may include a male attachment. The male attachment may include a protrusion which may be the pin protrusion 7. The protrusion 7 may have a non-round or polygonal cross-section. The pin input/output connector 62 may include a female attachment. The female attachment may include a bore. The bore may have a non-round or polygonal cross-section.

In an embodiment, at least one of the first piece 10, second piece 12 or pin 4 may include a metal or metal alloy. The metal can be a plate, a sheet, a woven fabric, a mesh, or metal foam. The metal can include steel, cold-rolled steel material No. 1.0338, cold-rolled steel material No. 1.0347, matt zinc-plated steel, stainless steel material No. 1.4512, stainless steel material No. 1.4720, stainless steel material No. 1.4310, aluminum, alloys, or any combinations thereof.

In another embodiment, the metal can have a coating. The coating can be a layer of another metal or alloy. In an embodiment, the coating is a metal or alloy containing at least one of the following metals: chromium, molybdenum, tungsten, manganese, iron, ruthenium, osmium, cobalt, rhodium, iridium, nickel, palladium, platinum, copper, silver, gold, zinc, cadmium, mercury, aluminum, gallium, indium, thallium, silicon, germanium, tin, lead, antimony, and bismuth.

In an embodiment, as shown in in FIGS. 1-3B, the torque assembly 2 may further include at least one washer 20. The washer 20 may be provided between the pin 4 and at least one of the first piece 10 or the second piece 12 of the housing 8. In an embodiment, as illustrated in FIG. 3E, the washer 20 may have a compound layer 22 thereon. The washer 20 may be adapted to modify torque between the pin 4 and the first piece 10 or the second piece 12 of the housing 8. The washer 20 may be adapted to modify torque between the torque assembly 2 torque supplying input, and the torque receiving output. The washer 20 can be frictionally coupled to at least one of the pin 4 and the first piece 10 or the second piece 12 of the housing 8. That is, the washer 20 can be frictionally coupled into engagement with at least one of the pin 4 and the first piece 10 or the second piece 12 of the housing 8, which can modify the torque of the pin 4 and at least one of the first piece 10 or the second piece 12 of the housing 8 through frictional resistance.

In an embodiment, as shown in in FIGS. 1-3B, the at least one washer can include a first washer 20A and a second washer 20B. The first washer 20A may include a washer bore 16 In an embodiment, at least one of the washer 20 or the first washer 20A, may have a radius $R_{w1}$ of at least 0.5 mm, of at least 2 mm, of at least 5 mm, at least 10 mm, at least 15 mm, at least 20 mm, at least 30 mm, at least 40 mm. The at least one of the washer 20 or the first washer 20A, may have a radius $R_{W1}$ that may be no greater than 5 mm, no greater than 10 mm, no greater than 15 mm, no greater than 20 mm, no greater than 30 mm, no greater than 40 mm. The first washer 20A bore 16 may have a radius $R_{WB}$ of at least 5 mm, at least 10 mm, at least 15 mm, at least 20 mm, at least 30 mm, at least 40 mm. The first washer 20A bore 16 may have an outer radius $R_{WB}$ that may be no greater than 5 mm, no greater than 10 mm, no greater than 15 mm, no greater than 20 mm, no greater than 30 mm, no greater than 40 mm. The washer 20 or first washer 20A may have an axial thickness $T_{w1}$, of at least 0.5 mm, of at least 1 mm, of at least 5 mm, at least 10 mm, at least 15 mm, at least 20 mm, at least 30 mm, at least 40 mm. The washer 20 or first washer 20A may have an axial thickness $T_{W1\ that}$ may be no greater than 5 mm, no greater than 10 mm, no greater than 15 mm, no greater than 20 mm, no greater than 30 mm, no greater than 40 mm.

In an embodiment, at least one of the washer 20 or the second washer 20B may have a radius $R_{W2}$ of at least 2 mm, of at least 5 mm, at least 10 mm, at least 15 mm, at least 20 mm, at least 30 mm, at least 40 mm. The least one of the washer 20 or the second washer 20B, may have a radius $R_{W2}$ that may be no greater than 5 mm, no greater than 10 mm, no greater than 15 mm, no greater than 20 mm, no greater than 30 mm, no greater than 40 mm. The second washer 20B may have an axial thickness $T_{W2}$, of at least 5 mm, at least 10 mm, at least 15 mm, at least 20 mm, at least 30 mm, at least 40 mm. The second washer 20B may have an axial thickness $T_{W2}$, which may be no greater than 5 mm, no greater than 10 mm, no greater than 15 mm, no greater than 20 mm, no greater than 30 mm, no greater than 40 mm. In an embodiment, at least one of the washer 20, the first washer 20A, or the second washer 20B may further include a cup spring washer 70.

In an embodiment, at least one of the washer 20, first washer 20A, or second washer 20B may include a compound layer 22 thereon. The compound layer 22 can include two or more layers on the exterior surface 27 of the washer 20, 20A, 20B. The compound layer 22 can include a first layer 29 and a second layer 31 on the surface 27 of the washer 20, 20A, 20B. The compound layer 22 can include at least one polymer. Exemplary polymers can include polytetrafluoroethylene (PTFE), fluorinated ethylene-propylene (FEP), polyvinylidenfluoride (PVDF), polychlorotrifluoroethylene (PCTFE), ethylene chlorotrifluoroethylene (ECTFE), perfluoroalkoxy alkane (PFA), polyacetal, polybutylene terephthalate (PBT), polyethylene terephthalate (PET), polyimide (PI), polyetherimide, polyetheretherketone (PEEK), polyethylene (PE), polysulfone, polyamide (PA), polyphenylene oxide, polyphenylene sulfide (PPS), polyurethane, polyester, liquid crystal polymers (LCP), or any combination thereof. The compound layer 22 can include two or more polymers.

In an embodiment, the compound layer 22 may comprise at least two polymer coatings comprising a first polymer P1 and a second polymer P2. The first layer 29 can include the first polymer P1, the second polymer P2, or a mixture of both, or may include an additional polymer $P_n$. The second layer 31 can include the first polymer P1, the second polymer P2, or a mixture of both, or may include an additional polymer $P_n$. The compound layer 22 can include additional layers including the first polymer P1, the second polymer P2, or a mixture of both, or may include an additional polymer $P_n$.

In an embodiment, the compound layer 22 can include two or more thermoplastic polymers. The first polymer, P1, may be a non-fluorinated thermoplastic polymer. P1 can be any non-fluorinated thermoplastic polymer. In an example, P1 can be selected from a polyimide (PI), a polyamidimide (PAI), a polyphenylene sulfide (PPS), a polyphenylene sulfone (PPSO2), a liquid crystal polymer (LCP), a polyetherketone (PEK), a polyether ether ketone (PEEK), an aromatic polyester (APE), a polyethersulfone (PES), a polyketone, a polyaramid, a polyetherimide, a polybenzimidazole, a derivation thereof, mixtures thereof in any weight ratio, or may be another non-fluorinated thermoplastic polymer. In an embodiment, the second polymer P2 may be a fluorinated polymer. P2 can be selected from any fluoropolymer. In one example, P2 can be selected from a polytetrafluoroethylene (PTFE), a modified polytetrafluoroethylene (TFM), tetrafluoroethylene-hexafluoropropylene (FEP), a perfluoroalkoxyethylene (PFA), an ethylene-tetrafluoroethylene (ETFE), a tetrafluoro-ethylene-perfluoro(methyl vinyl ether) (MFA), an ethylene chlorotrifluoroethylene copolymer (ECTFE), a polychlorotrifluoroethylene (PCTFE), a polyvinylidene fluoride (PVDF), mixtures thereof in an weight ratio, or may be another fluoropolymer.

The fluorinated polymer, P1, and the non-fluorinated thermoplastic polymer, P2, can be in any weight ratio. For example, the weight ratio of P1:P2 can be about 1:99, about 5:95, about 10:90, about 15:85, about 20:80, about 25:75, about 30:70, about 35:65, about 40:60, about 45:55, about 50:50, about 55:45, about 60:40, about 65:35, about 30:70, about 25:75, about 20:80, about 15:85, about 10:90, about 5:95, about 1:99. In one particular example, P1 is present in an equal or greater weight than P2. For example, the ratio P1:P2 can be about 99:1, about 98:2, about 97:3, about 96:4, about 95:5, about 94:6, about 93:7, about 92:8, or about 91:9.

In an example, each of the polymers of the compound layer 22 can present at various weight percentages. For example, P1 can comprise at least about 1 wt %, at least about 2 wt %, at least about 5 wt %, at least about 10 wt %, at least about 20 wt %, at least about 30 wt %, at least about 40 wt %, or at least about 50 wt % of the adhesive layer. In another example, P2 can comprise at least about 1 wt %, at least about 2 wt %, at least about 5 wt %, at least about 10 wt %, at least about 20 wt %, at least about 30 wt %, at least about 40 wt %, or at least about 50 wt % of the sliding layer.

In an embodiment, the polymers of the sliding layer do not exceed certain weight percentages. For example, the weight percentage of P1 is not greater than about 95 wt %, not greater than about 90 wt %, not greater than about 80 wt %, not greater than about 70 wt %, not greater than about 60 wt %, not greater than about 50 wt %, not greater than about 40 wt %, not greater than about 30 wt %, not greater than about 20 wt %, not greater than about 10 wt %, not greater than about 5 wt %, not greater than about 2 wt %, not greater than about 1 wt % of the compound layer 22.

In another embodiment, the weight percentage of P2 is not greater than about 95 wt %, not greater than about 90 wt %, not greater than about 80 wt %, not greater than about 70 wt %, not greater than about 60 wt %, not greater than about 50 wt %, not greater than about 40 wt %, not greater than about 30 wt %, not greater than about 20 wt %, not greater than about 10 wt %, not greater than about 5 wt %, not greater than about 2 wt %, not greater than about 1 wt % of the compound layer 22.

Any one of the polymers P1 or P2, or an additional polymer $P_n$ can be modified or functionalized. The modification of at least one thermoplastic polymer includes incorporation of functional groups that improve tribological, rheological, or adhesive properties of the unmodified thermoplastic. In embodiments, modified polymers include functional groups, such as keto groups, alkoxy groups, hydroxyl groups, carboxyl groups, or carboxyl ester groups as depicted by the following formulas:

wherein the radicals R are cyclic or linear organic residues having from 1 to 20 carbon atoms.

The functional groups can be incorporated into the thermoplastic polymer (P) by addition of at least one modifying agent (M). Suitable modifying agents are, for example, maleic acid and derivatives thereof, in particular the anhydride (1) thereof, itaconic acid and derivatives thereof, in particular the anhydride (2) thereof, and/or citraconic acid and derivatives thereof, in particular the anhydride (3) thereof. Other modifying agents include methylacryl acid and derivatives thereof (4) or its isomer crotonic acid and derivatives (5), wherein R in (4) and (5) can be hydrogen, a cyclic or linear organic residue having from 1 to 20 carbon atoms.

Here, the ratio of the polymer (P) to the modifying agent (M) can be from 99.9 mol % of (P): 0.1 mol % of (M) to 80 mol % of (P): 20 mol % of (M).

For example, variation of the ratio of polymer (P) and modifying agent (M) provides for changes in the MFI (melt flow index). The MFI is determined by the mass of polymer that can extrude through an orifice of defined dimensions at a specified temperature and load within 10 minutes. In general, the load is 5 kg and the temperature is approximately the melting point of the material to be characterized. For example, PFA has a melting point of approximately 372° C. and FEP or ETFE have melting points of approximately 297° C.

In an embodiment, the MFI of the sliding layer can be from 1 to 100 g/10 min, such as from 2 to 50 g/10 min, or from 3 to 25 g/10 min.

In embodiments, the functionalized polymer can be prepared from any fluoropolymer, including, tetrafluoroethylene-hexafluoropropylene (FEP), perfluoroalkoxyethylene (PFA), ethylene-tetrafluoroethylene (ETFE), tetrafluoro-ethylene-perfluoro(methyl vinyl ether) (MFA), modified polytetrafluoroethylene (TFM), polyvinylidene fluoride (PVDF), ethylene-chlorotrifluoroethylene (ECTFE).

In an embodiment, the compound layer 22 further includes at least one filler. The filler can enhance the slip interface of the compound layer 22. Exemplary fillers include glass fibers, carbon fibers, silicon, PEEK, aromatic polyester, carbon particles, bronze, fluoropolymers, thermoplastic fillers, aluminum oxide, polyamidimide (PAI), PPS, polyphenylene sulfone (PPSO2), LCP, aromatic polyesters, molybdenum disulfide, tungsten disulfide, graphite, grapheme, expanded graphite, boron nitrade, talc, calcium fluoride, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof.

In an embodiment, the compound layer 22 can be coupled to a backing layer (not illustrated), or substrate, or be on the surface of the washer 27 to enhance rigidity and structural support. The compound layer 22 can be applied to the backing layer by a coating technique, such as for example, physical or vapor deposition, spraying, plating, powder coating, or through other chemical or electrochemical techniques. In a certain embodiment, the compound layer 22 can be sintered to the backing layer. In a particular embodiment, the compound layer 22 may be applied by a roll-to-roll coating process, including for example, extrusion coating. The compound layer 22 can be heated to a molten or semi-molten state and extruded through a slot die onto a major surface of the backing layer. In another embodiment, the compound layer 22 can be cast or molded. In an embodiment, the compound layer 22 can be pressed or rolled to the backing layer. In a particular embodiment, pressing or rolling can occur at elevated temperatures, i.e., the compound layer 22 is hot-pressed or rolled. In some embodiments, an adhesive layer (not illustrated) can be disposed between the compound layer 22 and the backing layer.

In an embodiment, the torque assembly may be substantially free of lubricant. In another embodiment, the torque assembly 2 may include a lubricant on any of its components. The lubricant may include a grease including at least one of lithium soap, lithium disulfide, graphite, mineral or vegetable oil, silicone grease, fluorether-based grease, apiezon, food-grade grease, petrochemical grease, or may be a different type. The lubricant may include an oil including at least one of a Group I-GroupIII+oil, paraffinic oil, naphthenic oil, aromatic oil, biolubricant, castor oil, canola oil, palm oil, sunflower seed oil, rapeseed oil, tall oil, lanolin, synthetic oil, polyalpha-olefin, synthetic ester, polyalkylene glycol, phosphate ester, alkylated naphthalene, silicate ester, ionic fluid, multiply alkylated cyclopentane, petrochemical based, or may be a different type. The lubricant may include a solid based lubricant including at least one of lithium soap, graphite, boron nitride, molybdenum disulfide, tungsten disulfide, polytetrafluoroethylene, a metal, a metal alloy, or may be a different type. The torque assembly 2 may be entirely free of lubricant.

In an embodiment, at least one of the washer 20, first washer 20A, or second washer 20B may include at least one indent 71 in face of the washer 20, 20A, 20B. The indent 71 may increase the torque generated over the space between the pin 4 and at least one of the first piece 10 or the second piece 12 of the housing. The indent 71 may have a depth in a range of at least 0.5 mm, at least 1 mm, at least 5 mm, at least 10 mm. The indent 71 may have a depth in a range of no greater than 10 mm, no greater than 15 mm, no greater than 20 mm, no greater than 30 mm, no greater than 40 mm. The indent 71 may increase the spring force of the washer 20, 20A, 20B. The indent 71 may increase the spring force of the washer of at least 0.1 N, at least 1 N, at least 5 N, at least 10 N, at least 1000 N, at least 1000 N, at least 10000 N. In least one embodiment, at least one of the washer 20, first washer 20A, or second washer 20B may include at least one circumferential slot 73 along its thickness. The circumferential slot 73 may have a depth in a range of at least 0.5 mm, at least 1 mm, at least 5 mm, at least 10 mm. The circumferential slot 73 may have a depth in a range of no greater than 10 mm, no greater than 15 mm, no greater than 20 mm, no greater than 30 mm, no greater than 40 mm. The circumferential slot 73 may increase the spring force of the washer of at least 0.1 N, at least 1 N, at least 5 N, at least 10 N, at least 1000 N, at least 1000 N, at least 10000 N. In an embodiment, at least one of the at least one indent 71, material type in the compound layer 22, or at least one slots 73 may modify the torque of the pin 4 against at least one of the first piece 10 or the second piece 12 of the housing 8 and modify the torque of the torque assembly 2 via the torque providing input and the torque receiving output being connected to the torque assembly by at least one of the housing connector 60 or the pin connector 62. The modification of torque X is capable between about $0 \leq X \leq$ about 10 N·m for the torque assembly 2.

Figure 1B:
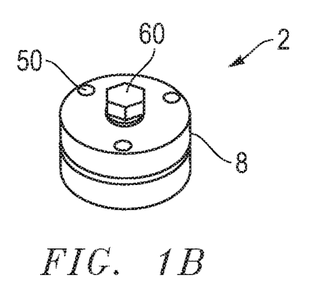
FIG. 1B is a perspective view of a torque assembly according to an embodiment of the invention.
Figure 2A:
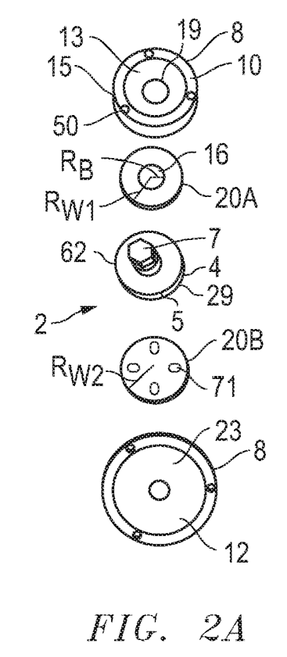
FIG. 2A is an exploded perspective view of a torque assembly according to an embodiment of the invention.
Figure 2B:
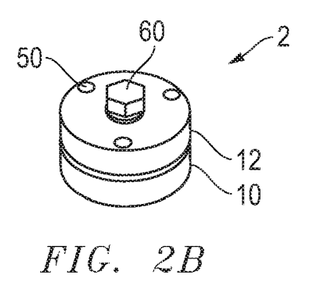
FIG. 2B is a perspective view of a torque assembly according to an embodiment of the invention.
Figures 3C, 3D:
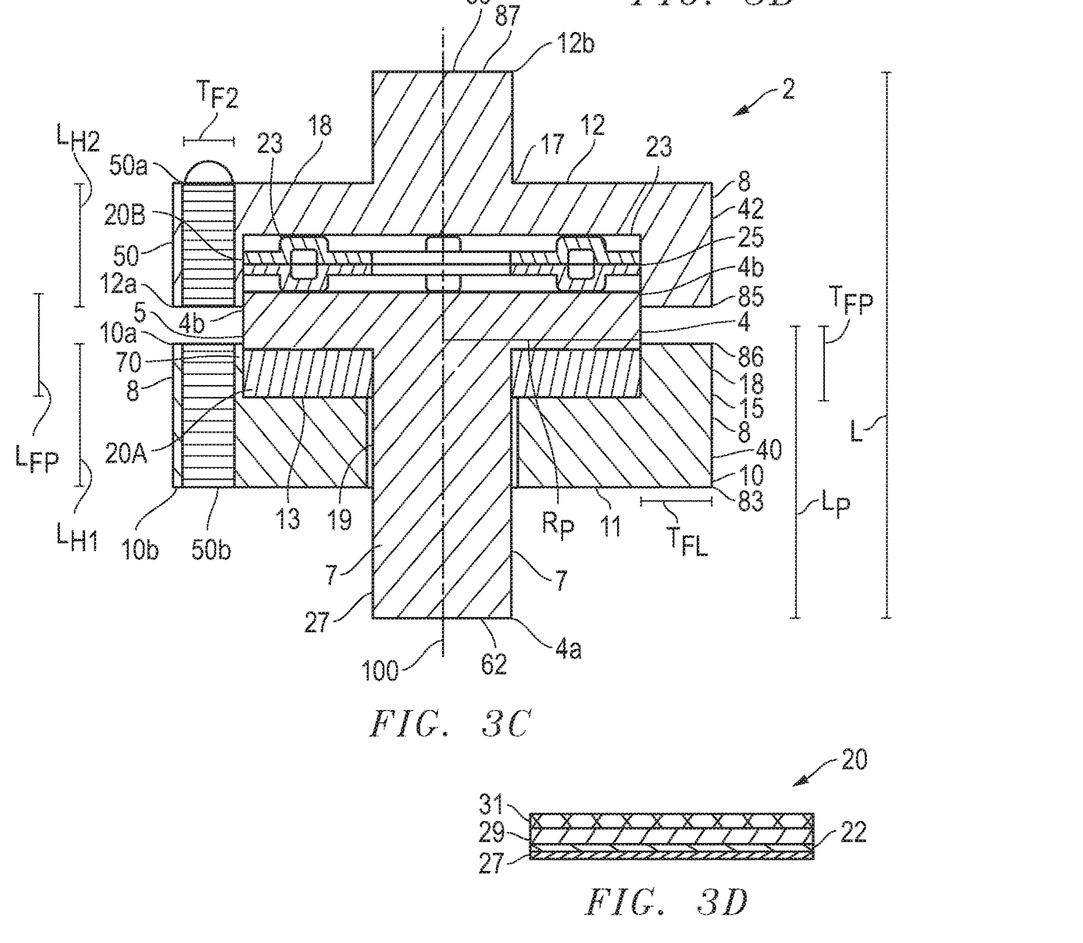
FIG. 3C is an cross section perspective view of a torque assembly taken along line $A_2$ in FIG. 3A according to an embodiment of the invention.
FIG. 3D is a perspective view of a possible material composition for a washer for a torque assembly taken along line $A_1$ in FIG. 1A according to an embodiment of the invention.

A method of assembling the torque assembly 2 is recited. The first washer 20A may be placed within the flange 15 of the first piece 10 of the housing 8. The bore 19 of the first piece 10 may at least partially align with the bore 16 of the first washer 20A. The pin may be aligned to place the pin protrusion 7 through the bore 19 of the first piece 10 and the bore 16 of the first washer 20A. In an embodiment, as shown in FIGS. 1B, 2B, and 3A-C, the first piece 10 of the housing 8 and the second piece 12 of the housing 8 may encompass the pin 4 such that the pin protrusion 7 may protrude through the bore 19 of the first piece 10 of the housing 10. In an embodiment, a second washer 20 may be placed within the flange 25 of the second piece 12 of the housing 8. The pin 4 may be contacted with the second washer 20 or the second piece 12 of the housing 8 to form the torque assembly 2, as best illustrated in FIGS. 1B, 2B, and 3C.

In an embodiment, the torque assembly 2 can be installed or assembled by an assembly force of at least 1 kg in a longitudinal direction relative to the housing 8, such as at least 2 kg, at least 3 kg, at least 4 kg, at least 5 kg, at least 10 kg, or even at least 15 kg. In a further embodiment, the torque assembly 2 can be installed or assembled by an assembly force of no greater than 20 kg in a longitudinal direction to the housing 8, such as no greater than 19 kg, no greater than 18 kg, no greater than 17 kg, or even no greater than 16 kg.

In an embodiment, the torque assembly 2 may be substantially free of lubricant to increase the longevity of the torque assembly 2 via the use of the at least one washer 20. In an embodiment, the torque assembly 2 may be substantially noise free via the use of the at least one washer 20. In an embodiment, the torque assembly may be provided with good performance over a range of conditions including temperature via the use of the at least one washer 20. In an embodiment, the torque assembly may provide overload protection via the use of the at least one washer 20.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

A torque assembly comprising: a housing comprising a first piece comprising a first face, a bore, and a first coupling attachment, and a second piece comprising a second coupling attachment; a pin comprising a flange and a pin protrusion extending therefrom, the pin protrusion protruding through the bore of the first piece; a first washer comprising a compound layer thereon adapted to contact the pin and the first piece of the housing to modify torque between the first piece and the pin; and a second washer comprising a compound layer thereon adapted to contact the pin and the second piece of the housing to modify torque between the second piece and the pin.

Embodiment 2

A torque assembly comprising: a housing comprising a first piece having a central axis comprising a axial first end comprising a first face, a bore, and a axial second end comprising a flange projecting around a circumference of the first face, and a second piece comprising a axial first end comprising a first face, and a axial second end comprising a flange projecting around a circumference of the first face; a pin comprising a axial first end comprising a first face and an axial second end comprising a pin protrusion protruding from the first face through the bore of the first piece; a first washer comprising a compound layer thereon adapted to contact the pin and the first piece of the housing to modify torque between the first piece and the pin; and a second washer comprising a compound layer thereon adapted to contact the pin and the second piece of the housing to modify torque between the second piece and the pin, wherein the torque assembly is substantially free of lubricant.

Embodiment 3

A method comprising: providing a torque assembly comprising: a housing comprising a first piece comprising first face, a bore, and a first coupling attachment, and a second piece comprising a second coupling attachment; a pin comprising a flange and a pin protrusion; a first washer comprising a compound layer thereon adapted to contact the pin and the first piece of the housing to modify torque between the first piece and the pin; and a second washer comprising a compound layer thereon adapted to contact the pin and the second piece of the housing to modify torque between the second piece and the pin; contacting the first washer with the first face of the first piece of the housing; contacting the second washer with the first face of the second piece of the housing; contacting the first piece of the housing with the second piece of the housing to at least partially surround the pin such that the pin contacts the first washer and the second washer, and the pin protrusion protrudes through the bore of the first face of the first piece; and rotating the assembly wherein at least one of the first washer or the second washer provides modification of torque based on the compound layer on at least one of the first washer or the second washer.

Embodiment 4

The torque assembly or method of any one of the preceding embodiments, wherein the pin protrusion comprising a pin connector comprising a protrusion face comprising a non-round cross-section.

Embodiment 5

The torque assembly, or method of any one of the preceding embodiments, wherein at least one of the first washer or the second washer comprises at least one circumferential slot along its thickness.

Embodiment 6

The torque assembly, or method of any one of the preceding embodiments, wherein the second piece of the housing further comprises a second face comprising a housing connector.

Embodiment 7

The torque assembly, or method of any one of the preceding embodiments, wherein the housing comprises a locking assembly comprising at least one male attachment component and at least one female attachment component adapted to lock the first piece of the housing to the second piece of the housing.

Embodiment 8

The torque assembly, or method of any one of the preceding embodiments, wherein the compound layer of the first washer comprises a first layer comprising a first polymer and a second layer comprising a second polymer.

Embodiment 9

The torque assembly, or method of embodiment 8, wherein the first polymer comprises a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof.

Embodiment 10

The torque assembly, or method of embodiment 8, wherein the second polymer comprises a fluoropolymer.

Embodiment 11

The torque assembly, or method of any one of the preceding embodiments, wherein the compound layer of the second washer comprises a first layer comprising a first polymer and a second layer comprising a second polymer.

Embodiment 12

The torque assembly, or method of embodiment 11, wherein the first polymer comprises a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof.

Embodiment 13

The torque assembly, or method of embodiment 11, wherein the second polymer comprises a fluoropolymer.

Embodiment 14

The torque assembly, or method of any one of the preceding embodiments, wherein the first washer comprises a first face comprising a washer bore contacting the pin protrusion along its circumference.

Embodiment 15

The torque assembly, or method of any one of the preceding embodiments, wherein the torque assembly is adapted to modify the torque X between about $0 \leq X \leq$ about 10 N·m between the pin and at least one of the first piece and the second piece of the housing.

Embodiment 16

The torque assembly, or method of any one of the preceding embodiments, wherein a radius of the first washer $R_{w1}$ abuts an inner radial edge of the flange of the first piece of the housing.

Embodiment 17

The torque assembly, or method of any of the preceding embodiments, wherein a radius of the second washer $R_{w2}$ abuts an inner radial edge of the flange of the second piece of the housing.

Embodiment 18

The torque assembly, or method of any one of the preceding embodiments, wherein at least one of the first washer or the second washer comprises a cup spring washer.

Embodiment 19

The torque assembly, or method of embodiment 19, wherein at least one cup spring washer has a spring rate of at least about 10 N/mm, about 25 N/mm, about 50 N/mm, about 100 N/mm, about 200 N/mm, about 500 N/mm, about 1000 N/mm, about 2000 N/mm, about 5000 N/mm, about 10000 N/mm.

Embodiment 20

The torque assembly, or method of any one of the preceding embodiments, wherein the torque assembly has a length of no greater than 5 mm, no greater than 10 mm, no greater than 15 mm, no greater than 20 mm, no greater than 30 mm, no greater than 40 mm.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range, including the end range values referenced. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed:

1. A torque assembly comprising:
a housing comprising a first piece comprising a first face, a first circumferential flange projecting axially from the first face, and a bore, and a second piece comprising a second face comprising an integral housing connector;
a pin comprising a flange and a pin protrusion extending therefrom, the pin protrusion protruding through the bore of the first piece;
a first washer comprising a compound layer thereon adapted to contact the pin and the first piece of the housing to modify torque between the first piece and the pin; and
a second washer comprising a compound layer thereon adapted to contact the pin and the second piece of the housing to modify torque between the second piece and the pin, wherein at least one of the first washer or second washer is frictionally coupled to the pin.

2. The torque assembly of claim 1, wherein the pin protrusion comprises a pin connector comprising a protrusion face comprising a non-round cross-section.

3. The torque assembly of claim 1, wherein at least one of the first washer or the second washer comprises at least one circumferential slot along its thickness.

4. The torque assembly of claim 1, wherein the housing comprises a locking assembly comprising at least one male attachment component and at least one female attachment component adapted to lock the first piece of the housing to the second piece of the housing.

5. The torque assembly of claim 1, wherein the first washer comprises a first face comprising a washer bore contacting the pin protrusion along its circumference.

6. The torque assembly of claim 1, wherein the torque assembly is adapted to modify the torque X between about $0 \leq X \leq $ about 10 N·m between the pin and at least one of the first piece and the second piece of the housing.

7. The torque assembly of claim 1, wherein a radius of the first washer $R_{w1}$ abuts an inner radial edge of a flange of the first piece of the housing.

8. The torque assembly of claim 1, wherein a radius of the second washer $R_{w2}$ abuts an inner radial edge of a flange of the second piece of the housing.

9. The torque assembly of claim 1, wherein at least one of the first washer or the second washer comprises a cup spring washer.

10. The torque assembly of claim 9, wherein at least one of the first washer or the second washer comprises a cup spring washer having a spring rate of at least about 10 N/mm.

11. The torque assembly of claim 1, wherein the torque assembly has a length of no greater than 40 mm.

12. The torque assembly of claim 1, wherein the compound layer of the first washer or the second washer comprises a polymer.

13. A torque assembly comprising:
a housing comprising a first piece having a central axis comprising a axial first end comprising a first face, a bore, and a axial second end comprising a flange projecting around a circumference of the first face, and a second piece comprising a axial first end comprising a first face, and a axial second end comprising a flange projecting around a circumference of the first face;

a pin comprising a axial first end comprising a first face and an axial second end comprising a pin protrusion protruding from the first face through the bore of the first piece;

a first washer comprising a compound layer thereon adapted to contact the pin and the first piece of the housing to modify torque between the first piece and the pin; and a second washer comprising a compound layer thereon adapted to contact the pin and the second piece of the housing to modify torque between the second piece and the pin, wherein the torque assembly is substantially free of lubricant, wherein the second piece of the housing further comprises a second face comprising an integral housing connector, wherein at least one of the first washer or second washer is frictionally coupled to the pin.

14. The torque assembly of claim 13, wherein the compound layer of the first washer comprises a first layer comprising a first polymer and a second layer comprising a second polymer.

15. The torque assembly of claim 14, wherein the first polymer comprises a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof.

16. The torque assembly of claim 14, wherein the second polymer comprises a fluoropolymer.

17. The torque assembly of claim 13, wherein the compound layer of the second washer comprises a first layer comprising a first polymer and a second layer comprising a second polymer.

18. The torque assembly, or method of claim 17, wherein the first polymer comprises a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof.

19. The torque assembly, or method of claim 17, wherein the second polymer comprises a fluoropolymer.

20. A method comprising:

providing a torque assembly comprising:

a housing comprising a first piece comprising first face, a first circumferential flange projecting axially from the first face, and a bore, and a second piece comprising a second face comprising an integral housing connector;

a pin comprising a flange and a pin protrusion;

a first washer comprising a compound layer thereon adapted to contact the pin and the first piece of the housing to modify torque between the first piece and the pin; and a second washer comprising a compound layer thereon adapted to contact the pin and the second piece of the housing to modify torque between the second piece and the pin;

contacting the first washer with the first face of the first piece of the housing;

contacting the second washer with the first face of the second piece of the housing;

contacting the first piece of the housing with the second piece of the housing to at least partially surround the pin such that the pin contacts the first washer and the second washer, and the pin protrusion protrudes through the bore of the first face of the first piece; and rotating the assembly wherein at least one of the first washer or the second washer provides modification of torque based on the compound layer on at least one of the first washer or the second washer, wherein at least one of the first washer or second washer is frictionally coupled to the pin.

* * * * *

UNITED STATES PATENT AND TRADEMARK OFFICE
CERTIFICATE OF CORRECTION

PATENT NO. : 10,876,580 B2
APPLICATION NO. : 15/826842
DATED : December 29, 2020
INVENTOR(S) : Lukas Plioska et al.

It is certified that error appears in the above-identified patent and that said Letters Patent is hereby corrected as shown below:

In the Specification

Column 11, Line 35, please insert --a-- between "in" and "face of the washer"

Signed and Sealed this
Sixteenth Day of August, 2022

Katherine Kelly Vidal
*Director of the United States Patent and Trademark Office*